(No Model.) 2 Sheets—Sheet 1.
B. A. FISKE.
METHOD OF AND APPARATUS FOR RANGE FINDING.
No. 523,721. Patented July 31, 1894.
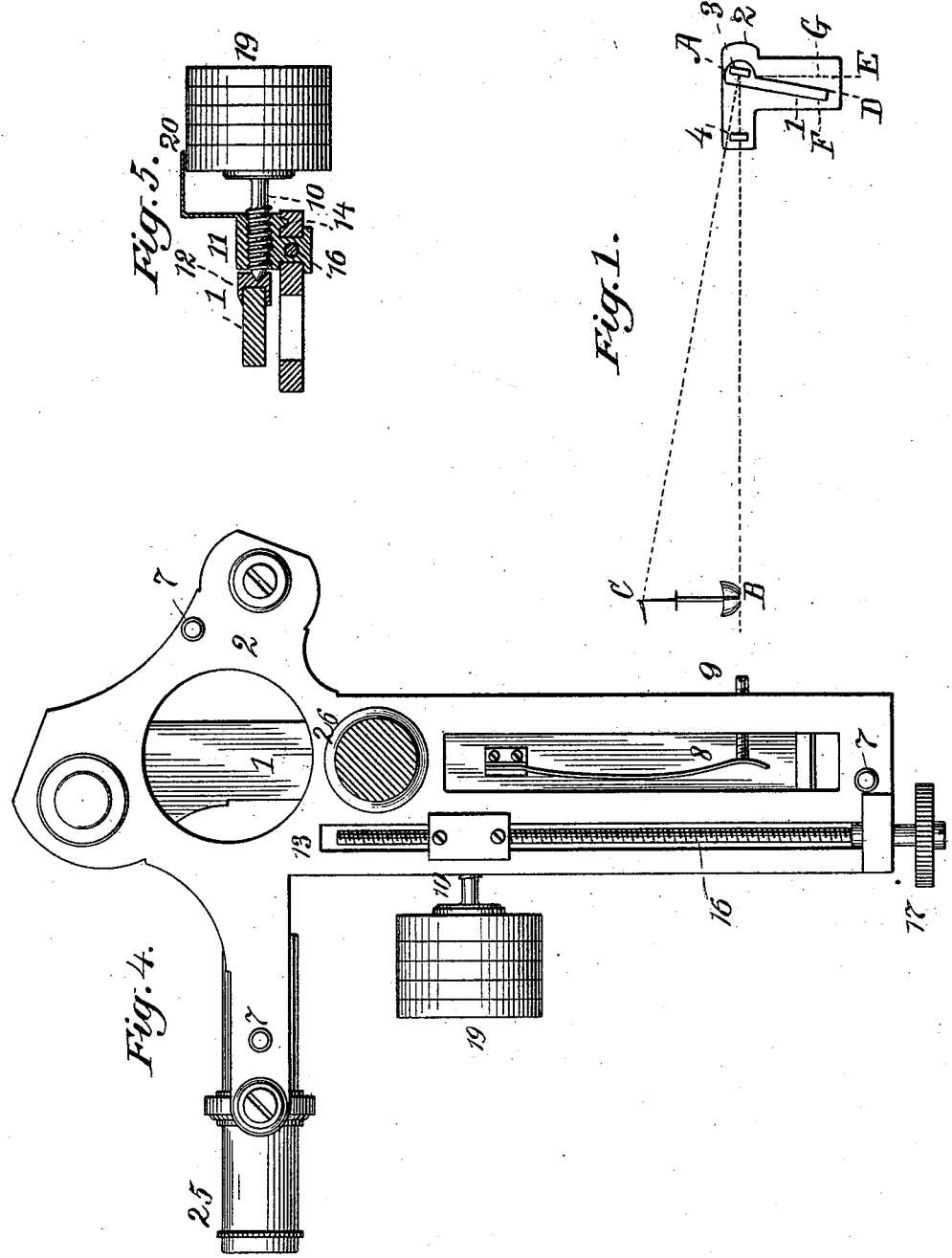
Witnesses:—
D. N. Haywood
N. R. Moller
Inventor:—
Bradley A. Fiske
by Park Benjamin
his attorney.

(No Model.) 2 Sheets—Sheet 2.
B. A. FISKE.
METHOD OF AND APPARATUS FOR RANGE FINDING.
No. 523,721. Patented July 31, 1894.
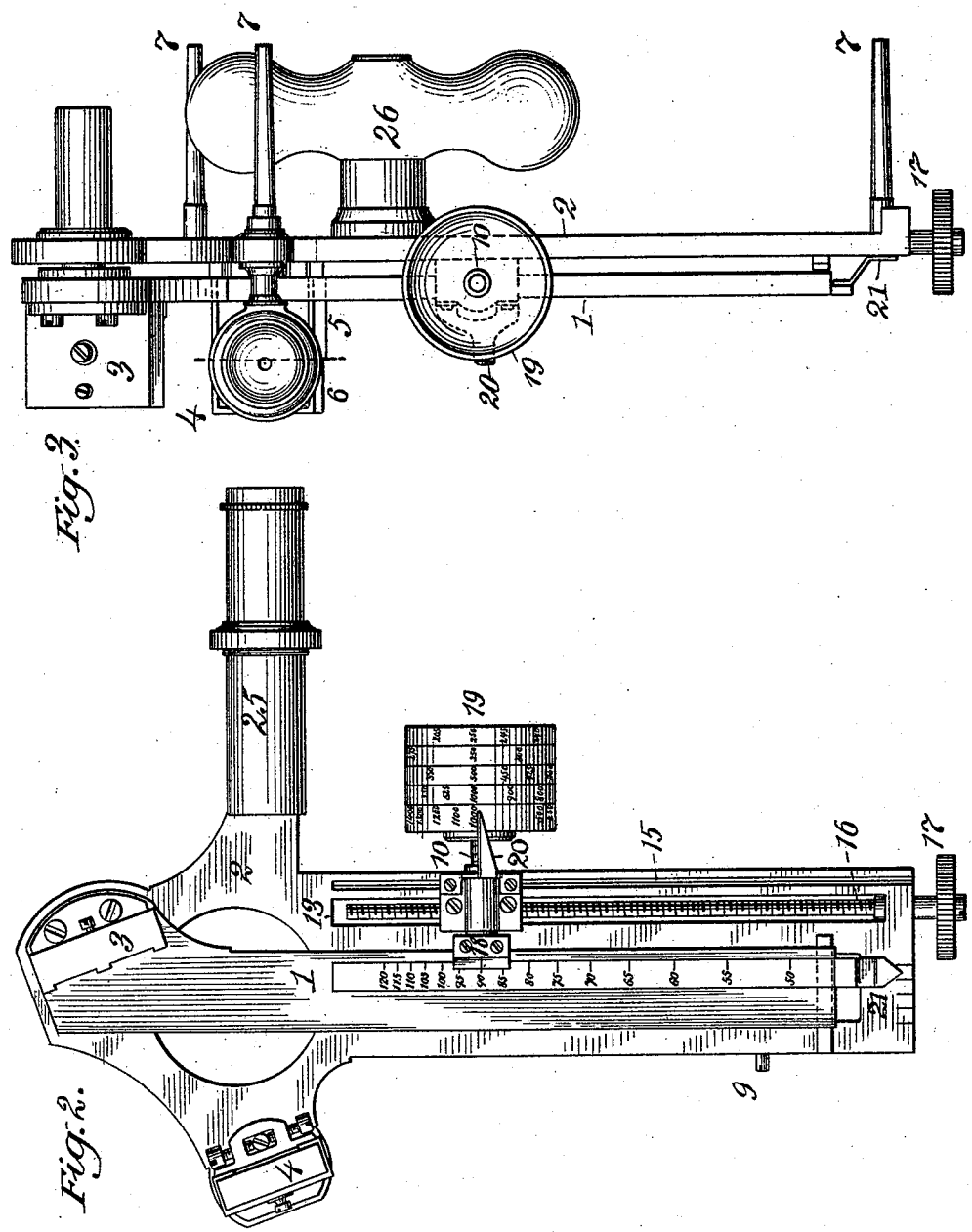
Witnesses:—
D. H. Hayford
H. P. Moller
Inventor:—
Bradley A. Fiske
by Park Benjamin
his Attorney

UNITED STATES PATENT OFFICE.

BRADLEY A. FISKE, OF THE UNITED STATES NAVY.

METHOD OF AND APPARATUS FOR RANGE-FINDING.

SPECIFICATION forming part of Letters Patent No. 523,721, dated July 31, 1894.

Application filed January 8, 1894. Serial No. 496,075. (No model.)

*To all whom it may concern:*

Be it known that I, BRADLEY A. FISKE, of the United States Navy, have invented a new and useful Improvement in Methods of and Apparatus for Range Finding, of which the following is a specification.

In the accompanying drawings, Figure 1 is a diagram illustrating the principle and mode of operation of my invention. Fig. 2 is an edge view of the instrument. Fig. 3 is a face view thereof. Fig. 4 is a rear view. Fig. 5 is a detailed view of the sliding bearing and index-adjusting screw in horizontal section.

Similar letters and numerals of reference indicate like parts.

The principle of my invention is as follows: reference being had to Fig. 1 of the drawings, which represents the instrument diagrammatically.

1 represents the index bar, shown as part of a practical working instrument in the remaining figures of the drawings.

2 is the frame of the instrument, upon which the bar 1 is pivoted at A.

Bar 1 carries a mirror, 3.

4 is a fixed mirror upon the frame 2.

The mirrors 3 and 4 are to be like the mirrors correspondingly situated in the ordinary nautical sextant; that is to say, the mirror 3 is entirely silvered, and the mirror 4 is a translucent glass silvered only over one-half of its area. Thus, referring to Fig. 3, the mirror 4 is silvered only on the right-hand half, 5. The left-hand half, 6, is a translucent or clear glass.

At B C is represented any distant object, as, for example, a vessel, the water line of which is at B and the mast-head at C. The distance B C will therefore be one side of a right-angle triangle, of which the dotted lines A C and A B are the other sides. As shown in the drawing Fig. 1, the mirrors 3 and 4 are not parallel.

When the index bar 1 is in the position A E, indicated by dotted lines, the mirrors 3 and 4 will be parallel. When it is moved to the position A D, so that the image of the point B in the mirror A coincides with the image of the point C in said mirror, then, according to the known theory of the sextant, the angle C A B will be equal to twice the angle D A E; or C A B = 2 D A E (1). Since these angles are always very small in practice there is no appreciable error in writing Sin C A B = 2 sin D A E (2)

whence $\dfrac{B\ C}{A\ C} = 2 \dfrac{F\ G}{A\ F}$ (3)

or $A\ C = B\ C \times \dfrac{A\ F}{2\ F\ G}$ (4).

I can therefore determine any distance A C if I know the length B C, and measure carefully on the instrument the lengths F G and A F at the time when the direct image of B coincides with the reflected image of C. The points F and G can evidently be taken anywhere along the lines A E and A D, since the ratio of A F to F G is always the same for any angle D A E. Therefore if the index bar 1 be so graduated that the length A F represents the distance A C, the length F G will clearly be a function of the distance B C, and can therefore be graduated in terms of B C; because, from the fourth formula, I get, by transposition, $F\ G = B\ C \times \dfrac{A\ F}{2\ A\ C}$ (5); or, conversely, if I so graduate the index bar 1 that the length A F represents the distance B C, the length F G will then represent the distance A C, and hence can be graduated in terms of A C.

To illustrate, B C represents the height, for example, of the mast-head of a vessel above the water line. If index bar 1 be so graduated that a distance of two thousand yards (six thousand feet) is represented by five inches on said index bar, then a mast-head height, or B C, of one hundred feet will be represented on F G by one-half an inch; for, by formula 5, $F\ G = \dfrac{100}{2 \times 6000} \times 5 = \dfrac{5}{120}$ of a foot (equal one-half inch), and a height of fifty feet will be represented by one-quarter inch. Or, if the index bar be so graduated that the mast-head height of one hundred feet is there represented by five inches, then, by the same formula, a distance of six thousand feet will be represented on F G by one-half inch, and a distance of twelve thousand feet will be represented by one-quarter inch; so that upon the instrument I may graduate the index bar 1 in terms of distance, and the length F G on the frame of the instrument for mast-head heights. Or, I may graduate the index bar for mast-head heights, and the length F G for distances; and therefore, by the use of the instrument, if I know either the mast-head height B C or the distance A C, the corresponding distance or mast-head height may be read at once when the direct and reflected image of the points B and C are made to coincide.

Referring now to the other figures of the drawings, the frame 2 carries the telescope 25 disposed opposite the mirror 4, as in the ordinary sextant, so that the line of sight of the telescope may pass directly through the unsilvered portion of the mirror 4 to the object. The relation of the mirror 3, mirror 4 and telescope 5 is also as in the ordinary sextant. The frame is also provided with a suitable handle, 26, on its rear side, and with legs, 7, for its support when the instrument is to be laid down on its side. On the rear side of the index bar 1, as shown in Fig. 4, is a leaf spring, 8, which bears against a screw, 9, in the frame. The object of spring 8 is to move the index bar 1 in the opposite direction to that in which it is moved by its adjusting screw 10. The construction of this adjusting screw is best shown in Fig. 5. It passes through a sliding piece, 11, and has a conical end which is received in a suitable cavity in a reinforce, 12, upon the edge of the index bar. When the screw 10 is turned in one direction, it moves the index bar so that the latter swings on its pivot in a direction against the action of the spring 8. When the screw 10 is turned in the other direction, the spring 8, bearing against the screw 9, moves the index bar correspondingly. The force of the spring 8 may be adjusted by means of the screw 9. The sliding piece 11 is disposed in a long slot, 13, in the frame, and also has a guide rib, 14, which is received in a groove or a channel, 15, also in the frame and parallel to the slot 13. Arranged in the long slot 13, and therefore in the lower part of the frame, is a long screw, 16, provided at its lower portion with a milled head, 17, by which it may be turned. It will be seen that by turning the head 17 and so rotating the screw 16, the sliding piece 11 may be caused to move along the slot 13.

The index bar 1 carries a scale, which, as shown, is preferably graduated for mast-head heights, and the sliding piece 11 carries an index plate, 18, placed in proximity to the scale on index bar 1, and provided with a central mark or score, which is used in the ordinary way for reading from said scale; hence, when the head 17 is turned, the index plate 18 travels along the scale on index bar 1. The scale on index bar 1 therefore represents A F on Fig. 1.

For the reason that the distance F G on Fig. 1 would, in practice, necessarily be made very short, and hence difficult to graduate minutely with sufficient clearness, I prefer to use the method ordinarily employed in constructing micrometers—that is, to place the axis of the screw 10 along the line F G and to arrange the graduations on the head of the screw. This screw head is here the cylinder 19, which is carried upon the screw 10, and upon the periphery of which is marked a number of circles, suitably graduated to represent distances A C. Upon the sliding piece 11 is carried an index arm, 20, placed in proximity to the periphery of the cylinder 19, by means of which the indications of the latter may be conveniently read. It will be plain that as the screw 10 is turned inward, successive circles will be brought up to the index 20.

In order to show conveniently how many times the cylinder 19 has been rotated in making an observation, and hence to indicate what circle is to be read from, I provide, at the end of the index bar 1, a pointer, 21, which moves over graduations on the frame 2; each graduated interval representing the movement of the index bar 1 due to one revolution of the cylinder 19. Hence, by noting the number of intervals passed over by the pointer 21 to the left it can be seen at once how many revolutions of the cylinder 19 have been made, and hence from what circle the scale on said cylinder is to be read. It will be understood, therefore, that the screw 10 is passed along the line F G of Fig. 1, and that the varying lengths of said line, due to changes in the position of the index bar 1, are read in terms of distance or A C on the cylinder 19; so that, in accordance with the principle of the apparatus already described, there will always be a ratio between the reading of the scale on the index bar 1 and the reading of the scale on the cylinder 19.

I will now explain how I use this instrument practically. The mast-head heights of most of the warships, for example, of the world are known and tabulated. When such a vessel is sighted, and has been recognized, this instrument may be at once used for finding her distance or range from the point of observation. This is done by simply turning the milled head 17 until the mark on the scale plate 18 is adjusted opposite to the scale mark or index bar 1 corresponding to said known mast-head height. Then the vessel is looked at through the telescope 25, the instrument being held by its handle 26 in the right hand of the observer, who, with his left hand, turns the cylinder 19 in one direction or the other, thereby moving the index bar 1 on its pivot, and so adjusting the mirror 3 until the image of her mast-head, reflected first from mirror 3 and then again from the silvered portion of mirror 4, comes into coincidence with her water-line as seen directly through the unsilvered portion of mirror 4. Or, in other words, the point C of Fig. 1 is brought into coincidence with the point B. When this happens, the observer first notes the number of intervals passed over by the pointer 21, and then reads the indication on the proper circle of the cylinder 19. As shown in Fig. 2, where the index plate 18 is set at 90, representing a mast-head height of ninety feet, the pointer 20 shows the distance one thousand yards on cylinder 19. Now if the vessel observed moves, or if the point of observation moves, thus changing the distance A C and so throwing the points B and C out of coincidence, all that the observer has to do is to move them into coincidence again, which can be done by a slight turn of the head 17, and again read the range or distance from the cylinder 19; and this he can keep doing constantly, thus getting the range of the distant vessel as often as desired. Similarly, the instrument can be used for measuring the unknown heights of objects which are at known distances from the observer. In such case, he would set the cylinder 19 so that the bar 20 would indicate the known distance, and then he would turn the milled head 17, so moving the plate 18 over the scale on index bar 1 until the points B and C of the distant object coincided as before. That done, he would read the height or interval between B and C directly from the scale on index bar 1; so that, for example, in Fig. 2, if he had previously set the cylinder 19 to show a distance of one thousand yards, previously known, and had turned the milled head 17 to bring the images, as stated, into coincidence, then he would read the height of the object as ninety feet from the scale on index bar 1.

The special importance of this instrument, however, lies in its use on naval vessels in connection with an apparatus for determining distance—such as a range finder.

The range finder invented by me, and now in use in the navy of the United States and other navies, is capable of determining the distance of a far-off object with great accuracy and celerity, by electrical means. It requires, however, two observers to train the telescopes disposed on the end of its base line upon the object, and it is necessarily located in positions on the deck which are more or less exposed to the effects of an enemy's fire, while in peace times on warships, or in its adaptation for determining distances of lighthouses, headlands, buoys, &c., on merchant vessels generally, the range finder needs no supplementary apparatus, for its indications can be taken with abundant rapidity. I have considered it extremely desirable that on board of vessels subject to the perils of battle, additional means should be provided which will guard against the effects of injury to the range finder or of the people stationed to use it. My present apparatus accomplishes this purpose perfectly, and, in fact, practically provides a vessel with just as many range finders, ready for instant use, as there are instruments of this kind on board. I will now explain how this comes about.

While, as I have stated, the mast-head heights of all war vessels are commonly known to the general staffs of all modern navies, and hence are promulgated to all cruising vessels, it is quite possible that, in event of war, ships will so disguise themselves, by changing, or apparently changing, their mast-head heights, as to deceive the enemy. In such event, the published information will be of doubtful value. Now my range finder does not at all depend upon any mast-head height measurements, but is capable of determining at once the distance of any object from the point of observation; and this, when the interval between the two objects, as, for example, two war vessels rapidly approaching, is in excess of that of the effective range of their guns; therefore, the established range finder on the ship may be used to find the enemy's distance before the actual conflict begins. The instant that distance is recognized, the present instrument comes into play; for its cylinder 19 is immediately set to indicate that distance. The instrument is then directed upon the approaching vessel, and the milled head 17 is manipulated in the manner already described until the mast-head of that vessel, seen through the telescope 25, appears to coincide with her water-line, or until any point on her, seen to be well above her water-line, and, of course, as far as possible therefrom, be made to appear to coincide with that line. As soon as that is done, the height of the mast-head or elevated point is read off on the scale on the index bar 1. The instrument is now set, and for all future determinations of distance, it is unnecessary to move the scale plate 18. All that the observer then does, in order to determine the range of the vessel at any moment, is to rotate the cylinder 19 so as to keep the two chosen points in coincidence through the telescope; therefore, for the ship that is looked at, the instrument becomes at once an efficient range finder, and therefore efficiently supplements the regular ship range finder by which the distance is at the outset originally determined. Consequently, if the latter becomes destroyed in action, or if the observers thereat are killed, means are readily at hand for still determining the range, and thus enabling the guns to be properly elevated.

As the present instrument is of very simple construction, and hence inexpensive in manufacture, a large number of them may be provided on board every war vessel, and thus, if desired, every officer may be equipped with means of determining, at any instant, the enemy's distance.

The instrument will also be found of especial value on board of all vessels approaching or plying along coasts; for the elevations of headlands, lighthouses and other prominent objects are ordinarily laid down on the charts; so that, on sighting one of these, all that is necessary is to adjust the instrument to show that height on the scale on the index bar 1, when the distance can be immediately read from the cylinder 19.

It will be noticed that it is not necessary to enter any tables showing distances corresponding to measured angles, as are necessary in connection with the use of the ordinary sextant for such purposes, and that the observer is not required to make any calculations whatever. All he has to do is to bring the two selected points B and C into apparent coincidence by looking through the telescope, and that done, to read off immediately from the instrument either the distance or the elevation.

I claim—

1. The combination in an instrument of the type hereinbefore described, having mirrors and a supporting frame as set forth, of a pivoted index-bar, an adjusting device for moving said bar on its pivot, and means such as a screw for moving said adjusting device on said frame and longitudinally said index-bar.

2. The combination in an instrument of the type hereinbefore described, having mirrors and a supporting frame as set forth, of a pivoted index-bar and a scale showing the extent of angular movement of said bar, an adjusting device operating upon said bar to turn it on its pivot, the said adjusting device being itself movable longitudinally to said index-bar, and a scale on said bar showing the extent of movement of said adjusting device.

3. The combination in an instrument of the type hereinbefore described, having mirrors and a supporting frame as set forth, of a pivoted index-bar and a scale showing the extent of angular movement of said bar, an adjusting device operating upon said bar to turn it on its pivot, the said adjusting device being itself movable longitudinally to said index-bar, and a scale on said bar showing the extent of movement of said adjusting device; the said scales being constructed in definite ratio one to the other.

4. The combination in an instrument of the type hereinbefore described, having mirrors and a supporting frame as set forth, of a pivoted index-bar, a sliding bearing in said frame movable longitudinally said index-bar, and a screw passing through said bearing and acting upon said index-bar to rotate said bar upon its pivot.

5. The combination in an instrument of the type hereinbefore described, having mirrors and a supporting frame as set forth, of a pivoted index-bar having a scale along one edge, a sliding bearing in said frame movable longitudinally said index-bar and provided with a pointer traversing said scale, a screw passing through said bearing and acting upon said index-bar to rotate said bar on its pivot, a graduated scale carried by said screw, and an index or pointer on said sliding bearing in proximity to said scale.

6. The combination, in a nautical measuring-instrument of a frame, 2, and supported thereon a horizon or object glass, 4, and a sight tube, 25; an index arm, 1, pivoted on said frame; an index glass, 3, carried by said arm; a traveling bearing 11, supported on said frame, and a screw, 16, for moving said bearing in a direction longitudinally said index arm; a scale on said index-arm for showing the extent of movement of said bearing, a screw, 10, received in said bearing and acting upon said index arm to move said arm on its pivot, and a scale, and a pointer, 20, for showing the amount of rotation of said screw, substantially as described.

BRADLEY A. FISKE.

Witnesses:
H. R. MOLLER,
M. BOSCH.